UNITED STATES PATENT OFFICE.

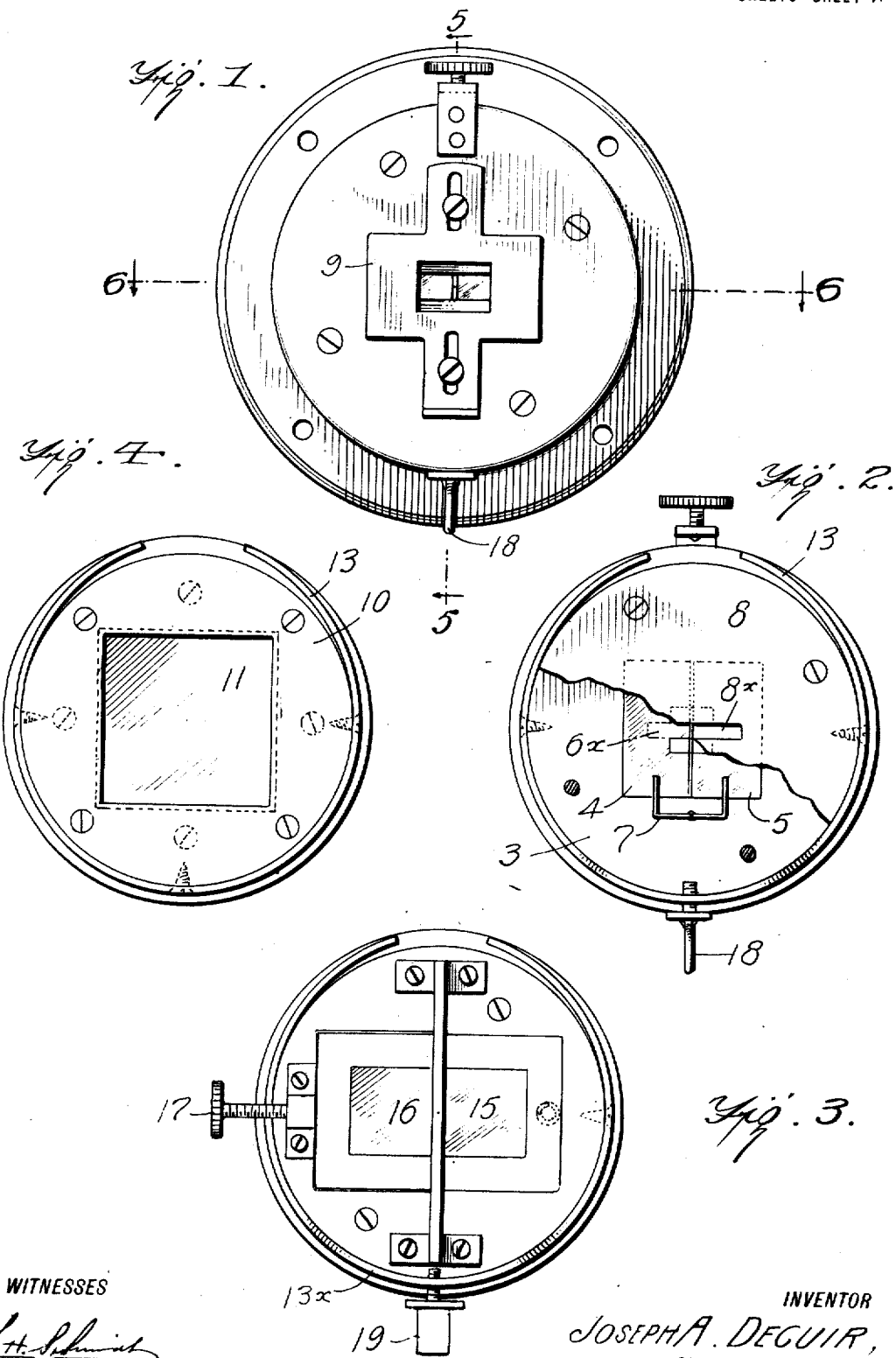

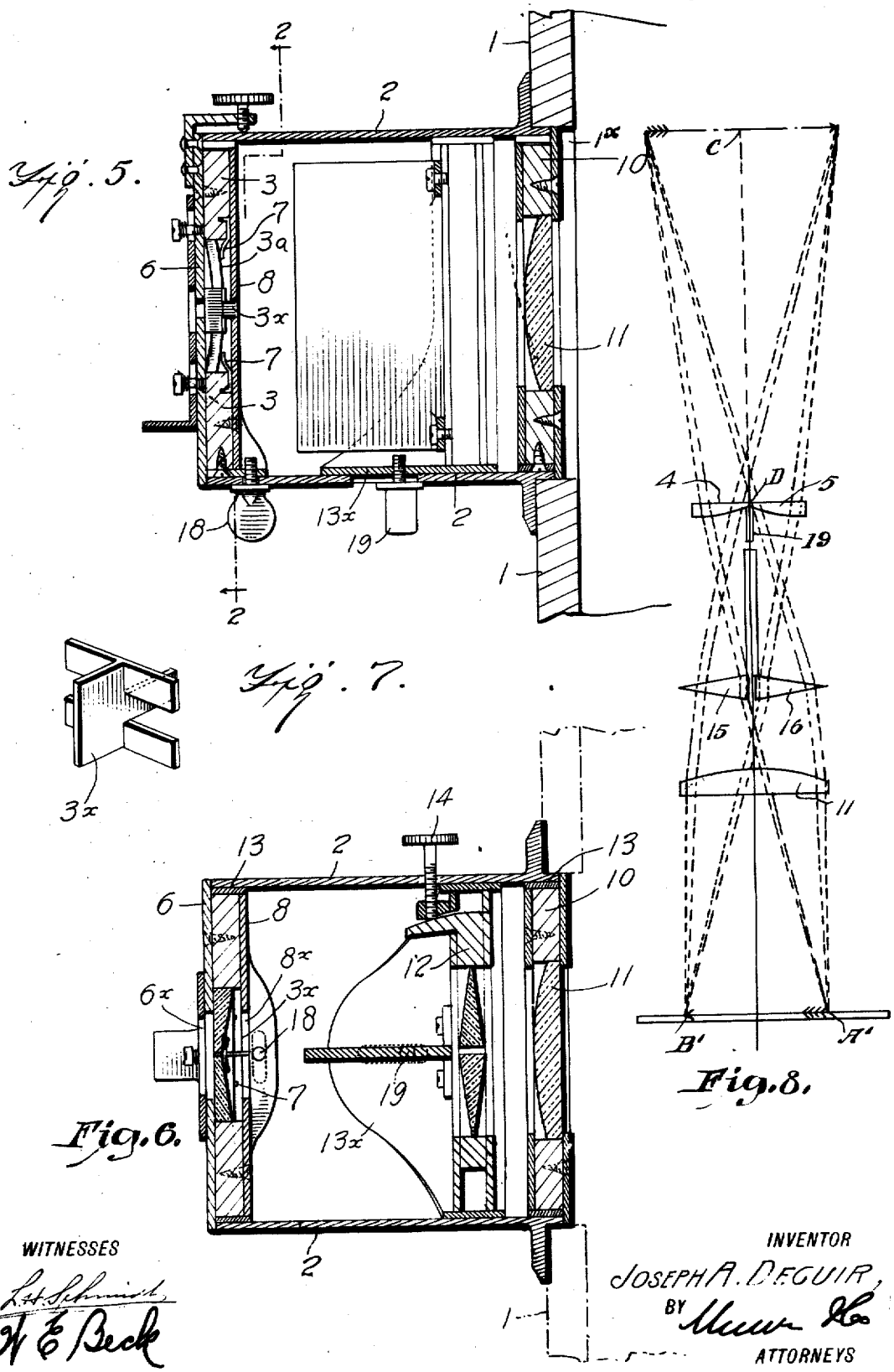

JOSEPH A. DECUIR, OF PROVIDENCE, RHODE ISLAND.

STEREOSCOPIC CAMERA.

1,319,762.  Specification of Letters Patent.  Patented Oct. 28, 1919.

Application filed June 13, 1916. Serial No. 103,468.

*To all whom it may concern:*

Be it known that I, JOSEPH A. DECUIR, a citizen of the United States, and a resident of Providence, in the county of Providence and State of Rhode Island, have invented a certain new and useful Improvement in Stereoscopic Cameras, of which the following is a specification.

My invention relates to improvements in stereoscopic cameras, and it consists in the combinations, constructions, and arrangements herein described and claimed.

An object of my invention is to provide a camera by means of which a stereoscopic image may be projected on the film or ground glass, each image has the appearance of solidity as if viewed through a stereoscope.

A further object of my invention is to provide a device of the type described having simple means for accomplishing the above named object.

My invention is illustrated in the accompanying drawings forming part of this application, in which:

Figure 1 is a front view of the lens tube;

Fig. 2 is a rear view of the front lens plate or carrier;

Fig. 3 is a front view of the intermediate lens plate or carrier;

Fig. 4 is a front view of the rear plate or carrier;

Fig. 5 is a section along the line 5—5 of Fig. 1;

Fig. 6 is a section along the line 6—6 of Fig. 1;

Fig. 7 is a detail view of a portion of the device, and

Fig. 8 is a diagrammatic view showing the path of the rays of light in forming the stereoscopic image.

In carrying out my invention, I make use of a camera or suitable casing 1 having a lens tube 2 which may be secured to the casing in an opening 1$^x$ in the latter, said lens tube being used in lieu of the ordinary lens tube. Disposed within the lens tube 2 are three lens plates or carriers. The forward lens plate or carrier 3 has a square opening 3$^a$ at its center, in which is inserted a lens made in the following manner: A spherical plano convex lens has a square portion cut from the center of the lens, each side of the square being three-sixteenths of the focal length of the lens. This square portion which is cut from the lens is now cut into two equal parts, the thin edges of the two parts being placed together so as to obtain two different foci distant from one another three-sixteenths of the focal length of the total lens.

In Fig. 2 I have shown the two halves of the lens which I have designated 4 and 5 respectively. On each side of the plate or carrier 3 is a metal plate. One of these metal plates 6 is in front of the lens, the latter being held to the front plate by means of springs 7 or in any other suitable manner, see Fig. 5. The rear plate 8 is secured to the plate 3. At the centers of both of the plates 6 and 8 there are registering openings which are rectangular, the length of each of the openings being one-half of the diameter of the total lens, with a width one-sixth of its own length. These openings are shown at 6$^x$ and 8$^x$.

In order to hold the lenses in spaced relation I prefer to use a device like that shown at 3$^x$ in Fig. 7. On the outside of the plate 6 is a slidable diaphragm 9.

The rear plate or carrier 10 contains at its center the middle portion of a spherical plano-convex lens having a focal length double that of the small lens. As shown in the drawings, the convex side is put toward the front disk or plate 3. This lens which I have shown at 11 is spaced from the front lens 4 and 5 a distance equal to about one-half of their focal length. This portion of lens 11 is also cut in the shape of a square measuring on its side one-eighth of the focal length of the total lens.

The central plate or carrier 12 contains at its center in a rectangular opening, two isosceles prisms, each of fifteen degrees, placed base to base. These prisms are cut square and have a height equal more or less to half the diameter of the small lens.

Each of the disks 3, 12, and 10 are provided with split spring rings, such as those shown at 13, which permit the disk or plate to slide with respect to the tubes 2, but which hold them firmly in their adjusted position. The metal ring 13 of the central plate or carrier is extended laterally at its bottom, as shown at 13$^x$ this extension being connected by means of a pressure screw 19.

The prism 15 is stationary; the other prism 16 turns on small hinges by means of a screw button 17, see Fig. 3, so as to bring the two images formed by the two front lenses 4 and 5, to the same focus, The common axis of the three plates or carriers must be perpendicular to the ground glass plate of the camera. A lens of any focus can be used, and the apparatus made of different sizes by keeping the same proportions stated above. The size of the sterescopic image varies according to the size of the apparatus, and measures in width about one fourth of the focal length of the front lens.

From the foregoing description of the various parts of the device, the operation thereof may be readily understood.

The device is placed in the front of a suitable camera, and at a distance not less than twelve feet from the subject. The carrier of plate 12 is moved toward the plate 10 as close as possible, and two images are formed on the ground glass. A good focus is taken by means of the left hand image, and the button or screw 17 is manipulated, that is to say, it is turned to the right or left, until the right image is also brought in focus. The button 18 is now moved from right to left or vice versa, until the slightest distance between all horizontal lines of the images disappears. The central plate 12 is now moved forward until the slightest distance between all vertical lines of the images disappears. At this point there will be produced on the ground glass a stereoscopic image of the subject.

In Fig. 8 I have shown a diagrammatic view of the path of the rays of light in forming an image. In this figure AB is the object, 4 and 5 represent the two sections of the plano-convex lens placed with their thin edges together in such a manner that the distance between the two foci is equal to $\frac{1}{10}$ of their focal length, and CD is the average distance from the front lenses to the object. At 15 and 16 are disposed the two isosceles prisms of 15° each, placed base to base, these prisms being movable between the lens 11 and the front lenses 4 and 5. A partition 19 is disposed between the front lenses 4 and 5 and the prisms for the purpose of preventing the production of more than one image by each of the two front lenses. The image is produced at A' B' on the ground glass of the camera.

When the device is once focused it can be used without any change if the operator places it so as to have the subject, or the nearest part of his subject in focus.

I claim:—

1. A stereoscopic camera, comprising a lens tube having therein three slidable lens carriers, one of said lens carriers having a pair of lenses arranged to focus at points distant from one another, another carrier having a pair of prisms and being movable toward and away from either of the other carriers, one of said prisms being stationary and the other being adjustable, and said prisms being arranged with their bases adjacent, and the third carrier having a single large lens.

2. A stereoscopic camera comprising a lens tube, a lens carrier disposed at one end of the tube and slidable with respect to the tube, said lens carrier having a pair of plano-convex lenses with the plane side toward the front, said lenses having foci in the same plane but spaced apart, a lens carrier at the rear of the tube, having therecarrier at the rear of the tube, having the plane face in a plano-convex lens with the plane face of the lens toward the rear, and an intermediate carrier having a pair of prisms disposed with their bases adjacent, one of said prisms being stationary and the other adjustable.

3. A stereoscopic camera comprising a lens tube, a lens carrier disposed at one end of the tube and slidable with respect to the tube, said lens carrier having a pair of plano-convex lenses with the plane side toward the front, said lenses having foci in the same plane but spaced apart, a lens carrier at the rear of the tube, having therein a plano-convex lens with the plane face of the lens toward the rear, an intermediate carrier having a pair of prisms disposed with their bases adjacent, one of said prisms being stationary and the other adjustable, and means for moving said intermediate lens carrier toward or away from either of the other carriers.

4. A stereoscopic camera comprising a lens tube, a lens carrier disposed at one end of the tube and slidable with respect to the tube, said lens carrier having a pair of plano-convex lenses with the plane side toward the front, said lenses having foci in the same plane but spaced apart, a lens carrier at the rear of the tube, having therein a plano-convex lens with the plane face of the lens toward the rear, an intermediate carrier having a pair of prisms disposed with their bases adjacent, one of said prisms being stationary and the other adjustable, means for moving said intermediate lens carrier toward or away from either of the other carriers, and means for rotating said pair of plano-convex lenses about the axis of a lens tube.

5. A stereoscopic camera comprising a lens tube, a lens carrier disposed at one end of the tube and slidable with respect to the tube, said lens carrier having a pair of plano-convex lenses with the plane side toward the front, said lenses having foci in the same plane but spaced apart, a lens carrier at the rear of the tube, having therein a plano-convex lens with the plane face of the lens toward the rear, an intermediate carrier having a pair of prisms disposed with their bases adjacent, one of said prisms being stationary and the other adjustable, means for moving said intermediate lens carrier toward or away from either of the other carriers, means for rotating said pair of plano-convex lenses about the axis of a lens tube, and means for adjusting one of said prisms with respect to the other.

6. In a stereoscopic camera, a pair of lens portions, each of said portions consisting of a part of a plano-convex lens, said portions having their thin edges contiguous, a diaphragm in the rear of said portions, said diaphragm having a small rectangular opening, a pair of 15° isosceles prisms disposed base to base with their contiguous parts in alinement with the contiguous parts of the said plano-convex lens portions, and a plano convex lens disposed in the rear of said prisms and acting as a condenser.

7. In a stereoscopic camera, a pair of lens portions, each of said portions consisting of a part of a plano-convex lens, said portions having their thin edges contiguous, a diaphragm in the rear of said portions, said diaphragm having a small rectangular opening, a pair of 15° isosceles prisms disposed base to base with their contiguous parts in alinement with the contiguous parts of the said plano-convex lens portions, a plano-convex lens disposed in the rear of said prisms and acting as a condenser, and means for varying the angular position of one of said prisms with respect to the other.

JOSEPH A. DECUIR.

Witnesses:
FREDERICK J. BUTT,
JOHN E. TOBIN.